Sept. 8, 1953 — M. FRENKEL — 2,651,516
GOVERNING MECHANISM WITH VARIABLE FORCE
Filed Dec. 18, 1948 — 4 Sheets-Sheet 1

INVENTOR
Meyer Frenkel

Sept. 8, 1953 M. FRENKEL 2,651,516
GOVERNING MECHANISM WITH VARIABLE FORCE
Filed Dec. 18, 1948 4 Sheets-Sheet 2

INVENTOR
Meyer Frenkel

Sept. 8, 1953          M. FRENKEL          2,651,516

GOVERNING MECHANISM WITH VARIABLE FORCE

Filed Dec. 18, 1948          4 Sheets-Sheet 3

INVENTOR

Meyer Frenkel

Sept. 8, 1953   M. FRENKEL   2,651,516
GOVERNING MECHANISM WITH VARIABLE FORCE
Filed Dec. 18, 1948   4 Sheets-Sheet 4

INVENTOR
Meyer Frenkel

Patented Sept. 8, 1953

2,651,516

UNITED STATES PATENT OFFICE 2,651,516

GOVERNING MECHANISM WITH VARIABLE FORCE

Meyer Frenkel, London, England

Application December 18, 1948, Serial No. 66,126
In Great Britain December 24, 1947

5 Claims. (Cl. 264—3)

This invention relates to centrifugal governing mechanisms for prime movers and other machines.

It is an object of this invention to provide constructions of centrifugal governing mechanisms, which can be adjusted, also during running of the governor, and with maintenance of desired degrees of sensitivity and stability of the governing action, to provide forces of different magnitudes to operate the control organ of an engine or engines to be governed, in other words, constructions of governors, which can be adjusted during running of an engine to govern this engine in different states, which may require different governing efforts, or which can be adjusted to govern different engines requiring different governing efforts.

It is a further object of this invention to provide constructions of centrifugal governing mechanisms, which can be adjusted, also during running of the governor, to provide forces of different magnitudes to operate the control organ of an engine or engines to be governed, and which can be set, also during running of the governor to govern to any desired speed of rotation of the shaft of an engine or engines to be governed.

It is a further object, to provide constructions of governor, in which adjustment of governing force takes place automatically.

It is known that in an ordinary centrifugal governor, before sleeve-motion and thus governing can taken place, the change in the centrifugal force on the rotating bodies due to a change in governor spindle speed must produce a force on the governor sleeve which is sufficient to overcome the resistance of the engine control mechanism $$\left(\frac{T}{e}\right)$$

for direct acting governors (or the resistance of the servomotor control for servo-motor types) as well as the frictional resistance (F) of the sleeve itself.

Thus a governor, to be sensitive, must be so designed that for the desired change in governor spindle speed $\Delta\omega$ at which governing is to take place, the change in centrifugal force $\Delta C_{(\omega)}$ corresponding to this change of spindle speed only (no change of radius of the path of the rotating bodies as yet takes place) is of magnitude $$\beta \Delta C_{(\omega)} = \beta \cdot \frac{\partial C}{\partial \omega} \cdot \Delta\omega \geq F + \frac{T}{e} \qquad (1)$$

where $\beta$ is the ratio in which, depending on the construction of the governor, an axial force on the governor sleeve is translated into a force on the rotating bodies in the line of action of the centrifugal force on them.

In other words, a change in centrifugal force on the rotating bodies as function of a change in radius of their path, which would increase the total change of centrifugal force and would support the required motion of the governor sleeve, cannot arise before the change of centrifugal force as function of the change of spindle speed only has produced motion of the governor sleeve against the resistances.

In Equation 1, with $M_b$ the mass of bodies rotating at radius R $$\Delta C_{(\omega)} = \frac{\partial C}{\partial \omega} \cdot \Delta\omega = \frac{\partial}{\partial \omega}(M_b R \omega^2) \Delta\omega = M_b R \, 2\omega \Delta\omega$$
$$= \theta(\omega) \Delta\omega$$

i. e. it is seen that the change in centrifugal force arising due to a change of spindle speed only is directly proportional to the original spindle speed.

When now an ordinary governor is designed to be sensitive at a high spindle speed, $\omega_1$—when $$\frac{\partial C}{\partial \omega} = \theta(\omega_1) = 2 M_b R \omega_1$$

is large this means that for a required change in spindle speed, at which governing is to take place, condition (1) is satisfied, $$\beta \Delta C_{(\omega_1)} = \beta \cdot \theta_{(\omega_1)} \cdot \Delta\omega_1 \geq F + \frac{T}{e} \qquad (1)$$

i. e. the change in centrifugal force on the rotating bodies as function of the given change in spindle speed only is sufficient to overcome the control organ resistance and the sleeve friction thus causing governing action.

If one now attempts to use the same governor at a small spindle speed, $\omega_2$ (having made the necessary spring etc. adjustments), when $$\theta(\omega_2) = \frac{\partial C_2}{\partial \omega} = 2 M_b R \omega_2$$

is proportionally smaller, and the $\Delta\omega_2$ at which governing is to start, will also be smaller than the change in spindle speed $\Delta\omega_1$ for the high speed governor if governing within the same percentage limits is desired, it is seen that $$\Delta C(\omega_2) = \theta(\omega_2) \cdot \Delta\omega_2 = 2 M_b R \omega_2 \cdot \Delta\omega_2$$

the change in centrifugal force on the rotating bodies as function of the change of spindle speed, is very much smaller than for the high speed governor (more than the proportion of the spindle speeds), while the resistances of the control mechanism and the sleeve friction have remained the same, so that condition (1) cannot be fulfilled.

Thus, at the small spindle speed, the change in centrifugal force on the rotating bodies due to a required change in spindle speed only will not be able to overcome the control organ resistance and sleeve friction, so that the governor cannot work at the low spindle speed.

Conversely, when a governor, which is sensitive at low spindle speeds, is used at high spindle speeds, it will, due to the $\Delta C_{(\omega)}$, the changes of centrifugal force as function of the changes of spindle speed, being correspondingly larger, be sensitive even to the normal cyclic variations of spindle speed occurring at constant mean spindle speed, and will be useless in this way.

To achieve the objects of the invention in view of the above properties of conventional governors, this invention provides:

A governing mechanism with a centrifugal speed responsive device comprising a spindle, a set of centrifugal bodies, a guiding means for rotating said centrifugal bodies with the rotary speed of said spindle and for permitting radial motion of said centrifugal bodies relative to said spindle, a sleeve-member axially movable relative to said spindle and a connecting means between said centrifugal bodies and said sleeve member for relating radial motion of said centrifugal bodies and axial motion of said sleeve member, said governing mechanism further comprising a separate control sleeve axially movable relative to said spindle, a means for connecting said control sleeve to an engine to be governed, a resilient balancing means, a connection between said resilient balancing means and said control sleeve, and a secondary spring means situated between and connecting said sleeve member of said speed responsive device and said control sleeve for permitting axial motion of said sleeve member of said speed responsive device independently of said control sleeve.

Further this invention provides:

In and for a governing mechanism, a centrifugal speed responsive device comprising a spindle, a set of centrifugal bodies, a guiding means for rotating said centrifugal bodies about said spindle and for permitting radial motion of said centrifugal bodies relative to said spindle, a sleeve member axially movable relative to said spindle, a connecting means between said centrifugal bodies and said sleeve member for relating radial motion of said centrifugal bodies and axial motion of said sleeve member, and manually operable means for varying the centrifugal mass effective in said speed responsive device independently of the axial position of said sleeve member, said means comprising a frame situated adjacent at least one centrifugal body, a mounting for rotating said frame with said spindle, means mounted in said frame for locking at least said one centrifugal body in a radial position nearest said spindle in which connection of said centrifugal body with said sleeve member is disestablished, and for releasing said centrifugal body from said radial position, and manually operable means for actuating said locking and releasing means independently of the axial position of said sleeve member.

As described in some detail with reference to the drawing, the provision of a separate control sleeve (i. e. the sleeve which actuates the control organ of the engine being governed) which is separated from the sleeve member by a secondary spring means and is also acted upon by the resilient balancing mechanism for the speed responsive device, effects that a change of shaft speed which would in a conventional governor be insufficient to overcome the control sleeve resistance, already moves the sleeve-member. Thereby the action of the centrifugal force is reinforced as a function of the change of radius of the centrifugal bodies which takes place with sleeve-motion while the control sleeve is yet stationary, and further due to the action of the secondary spring means between the sleeve-member and the control sleeve, so that altogether the control sleeve is set in motion by a change of shaft speed which is smaller than that required to overcome the same control-sleeve resistance by means of a conventional governor. This increases sensitivity, particularly at the lower end of a range of speeds in a variable speed governor, and has valuable effects on the operation of the governor.

The following can be said with reference to the provision for variable effective mass of the centrifugal bodies.

It will be seen that the condition of making M, the effective mass of the centrifugal bodies variable as function of the speed setting can be fulfilled if the total range of set speeds to be covered is divided into $m$ part ranges, and the effective mass of the centrifugal bodies is made to vary in steps from range to range, remaining the same within each part range of set speeds.

It can be shown that, with the same resilient balancing mechanism and no other alterations being effected in the governor, the characteristic curve (C-curve of centrifugal force for equilibrium at the beginning of the steady state plotted against corresponding radii of the centrifugal bodies) is the same for all such part ranges.

Accordingly, if the governor is stable in one of the part ranges, it will be stable in all part ranges of speed-setting.

The invention will now be described by way of example and in detail with reference to the accompanying drawing, in which.

Figure 1:
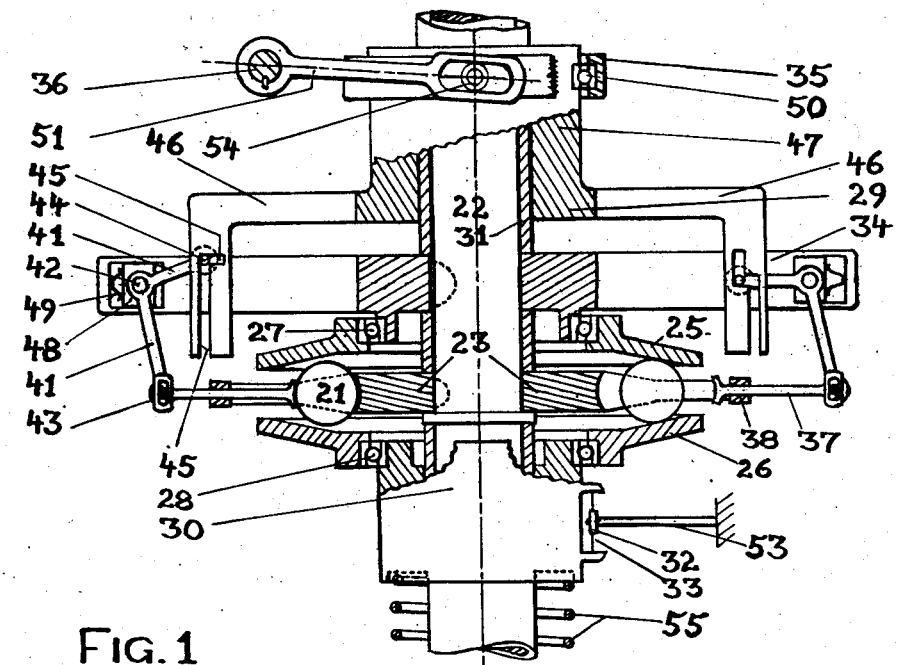
Figs. 1 and 2 are respectively a sectional elevation and section plan of a detail illustrating the provision for adjusting the effective centrifugal mass of a governor.
Figure 2:
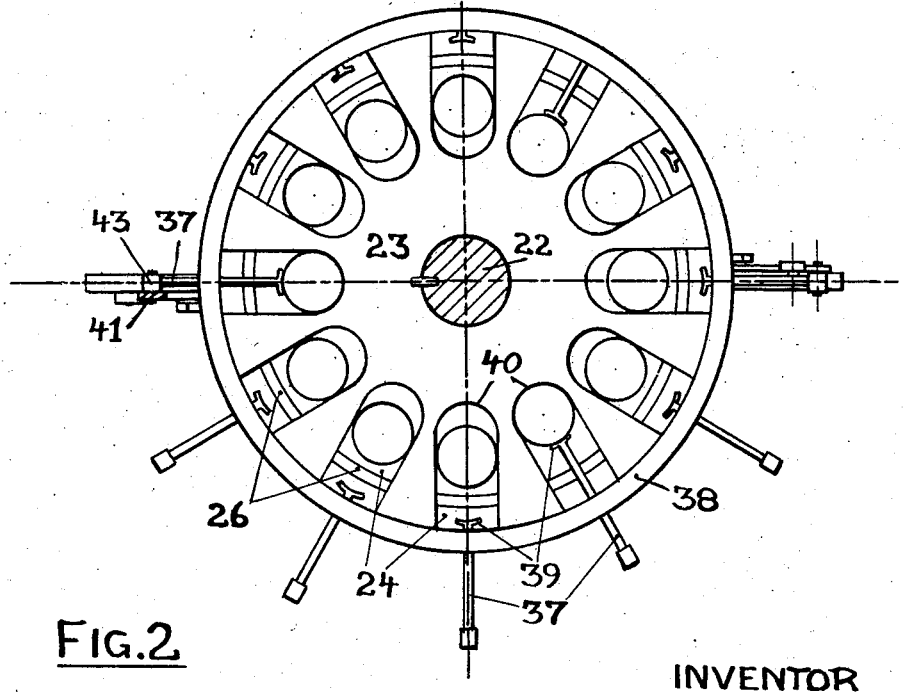

In the detail of Figs. 1 and 2, 12 balls, denoted by reference numerals 21, form the centrifugal bodies of the speed responsive device, which are rotated about the governor spindle 22 in the radial slots 24 of a guiding cage 23, which is keyed to the governor spindle. The balls 21 and cage 23 are interposed between two conical cups 25 and 26 respectively, mounted respectively on ball bearings 27 and 28, to be able to rotate freely due to their contact with the balls 21. The ball bearing 27 is mounted with its other ring on collar 29, which is keyed to and rotates with the spindle 22, so that conical cup member 25 is incapable of axial motion relative to the governor spindle. The ball bearing 28, however, which carries the conical cup member 26, is mounted on the sleeve member 30 of the speed responsive device, which is axially slidable along the governor spindle, so that cup member 26 carries out axial motions along the governor spindle corresponding to radial motions of the balls, transmitting these to the sleeve member 30. This sleeve 30 is prevented from rotation in a way giving rise to minimum frictional resistance to axial motion of this member, by means of a roller 32 mounted on a rod 53 on the governor housing 52, which engages either of two wires 33 stretched on sleeve member 30 parallel to the governor spindle axis. For one direction of rotation roller 32 engages one wire 33 and for the opposite direction the other wire 33.

The device for varying the effective mass of the centrifugal bodies comprises radial rods 37, mounted in the cage-rim 38 at each radial slot 24 of the cage 23, so as to be capable of radial motion between two positions, in the outer of which the ball 21 is left free to move radially in its slot 24, while in the inner position the cup-shaped ends 39 of rods 37 lock the ball 21 against the inner rim 40 of the slot 24, so that the ball then has no contact with the conical cups in any of their positions, and cannot move at all under centrifugal force.

In this example, 12 balls are provided, and the variation of the effective centrifugal masses is indicated to take place in four stages—three of the balls, symmetrically disposed about the governor spindle 22, are always left in action to produce governing in the highest range of spindle speeds, so that no locking rods 37 need be provided in the slots 24 of these 3 balls—and the further balls are brought into action by withdrawing three of the locking rods at a time, as the spindle speed to be governed is reduced, until finally, at the lowest speed-range to be covered, all 12 balls are in action. The bringing into action, or taking out of action, of groups of balls, may be synchronised with suitable alterations of the effect of the balancing spring means, to provide for smooth action of the governor over its whole range of speeds.

The adjustment of locking-rods 37 is shown in this example to be effected by means of angled levers 41, mounted on pins 42 fixed on the respective radial extensions 34 of the collar 29, which rotates with the governor spindle. The levers 41 engage the ends 43 of the rods 37, which are slotted to allow for obliquity, with their one ends, and at their other ends the levers 41 carry pins 44, which engage the slots 45 in the radial extensions of the sleeve 47, which is mounted on the governor spindle to rotate therewith and to be capable of axial motion relative to this spindle. Each locking rod 37 has a radial extension of sleeve 47 corresponding to it, and the slots 45 in these radial extensions 46 are so shaped, that, through one axial motion of the sleeve, a desired three of the levers 41 perform their motion, thus locking or unlocking a set of three balls, while, during the same motion of the sleeve 47, the other levers 41 remain in the positions they occupied before. For a following motion of sleeve 47, a further three levers 41 move, the others remaining in their previous positions, so that by motion up or down the governor spindle of sleeve 47 the desired adjustment of the effective centrifugal masses takes place stage by stage during running of the governor.

The fulcra 42 of levers 41 are mounted in slides 48, which are movable in the radial direction against springs 49, which prevents the mechanism from being rigid, and further effects that, in the locked position, the rods 37 always exert a force due to the spring 49 on the balls, so that the balls are firmly locked and cannot move about.

The axially slidable sleeve 47, which rotates with the governor spindle, carries a ring 35 mounted on a ball bearing 50 at its end. Ring 35 engages a double lever 51 with two radially oppositely placed pins 54, this lever being fixed to axle 36 mounted in the governor housing 52, by means of which adjustment of the effective centrifugal mass of the governor takes place from outside the governor housing during running of the governor.

It will be understood from the example given, that the locking or release of the balls or groups of balls can be effected by many kinds of mechanism besides that described without departing from the invention—e. g. the locking device on the cage may be worked from inside a hollow governor spindle, or from mechanisms disposed about the governor spindle, and connected to the cage through a central opening in one or both of the conical cups—which kind of arrangement would effect an appreciable saving in overall diameter of the assembly. Further, some such arrangement connecting to the cage from the inside would enable cup 25 of this example to be mounted through bearing 27 on a non-rotating part of the governor, so that it will then move under the same conditions as the cup 26, which is mounted on the non-rotating sleeve 30.

Further, the locking of the balls need not be effected necessarily by a locking rod movable in the radial direction but could also be effected by levers mounted on the cage, or other suitable means.

Figure 3:
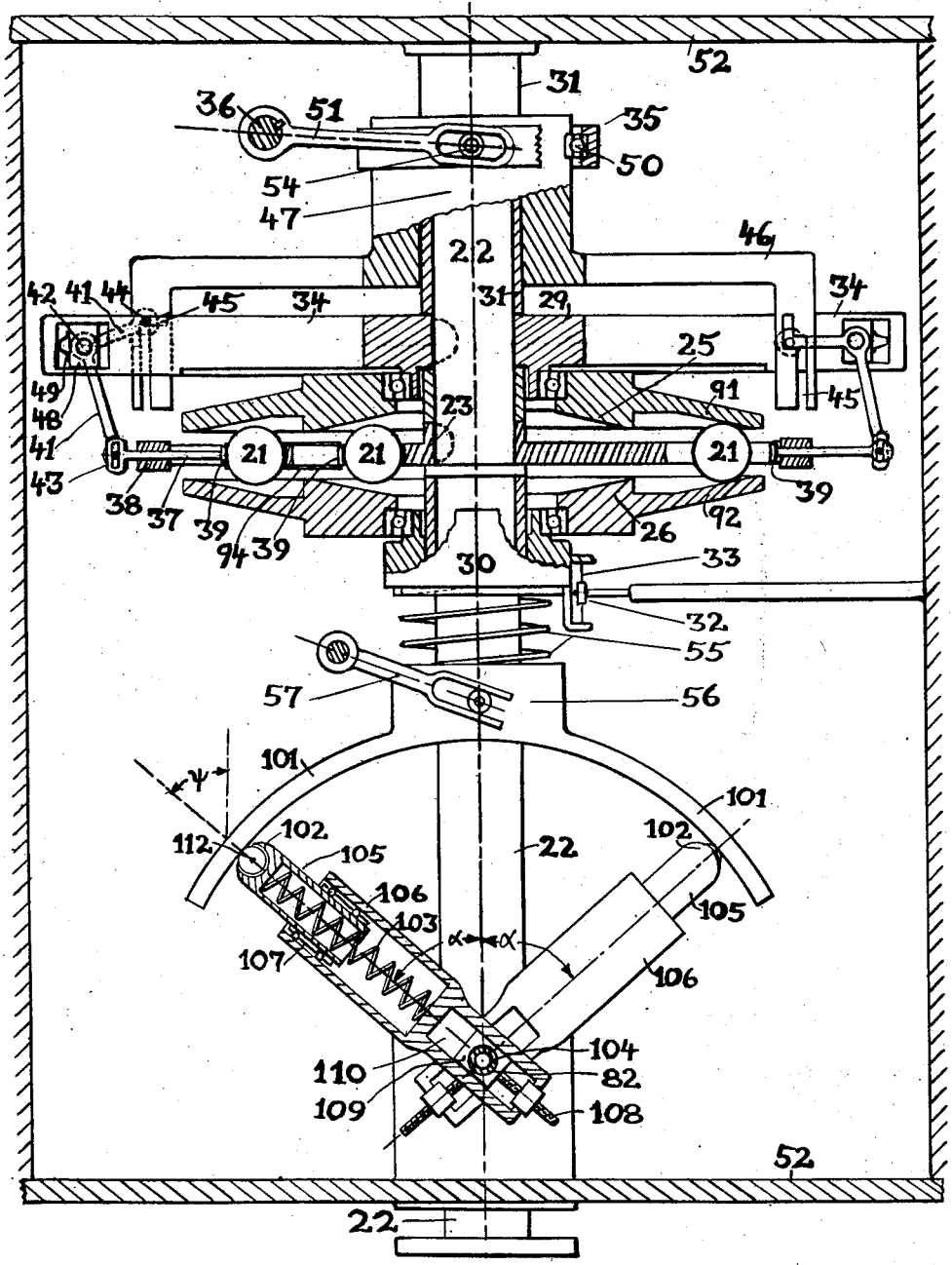
Fig. 3 is a sectional elevation of a governor embodying the separate control sleeve with secondary spring means, as well as the provision for adjusting the effective centrifugal mass of the governor.
Figure 4:
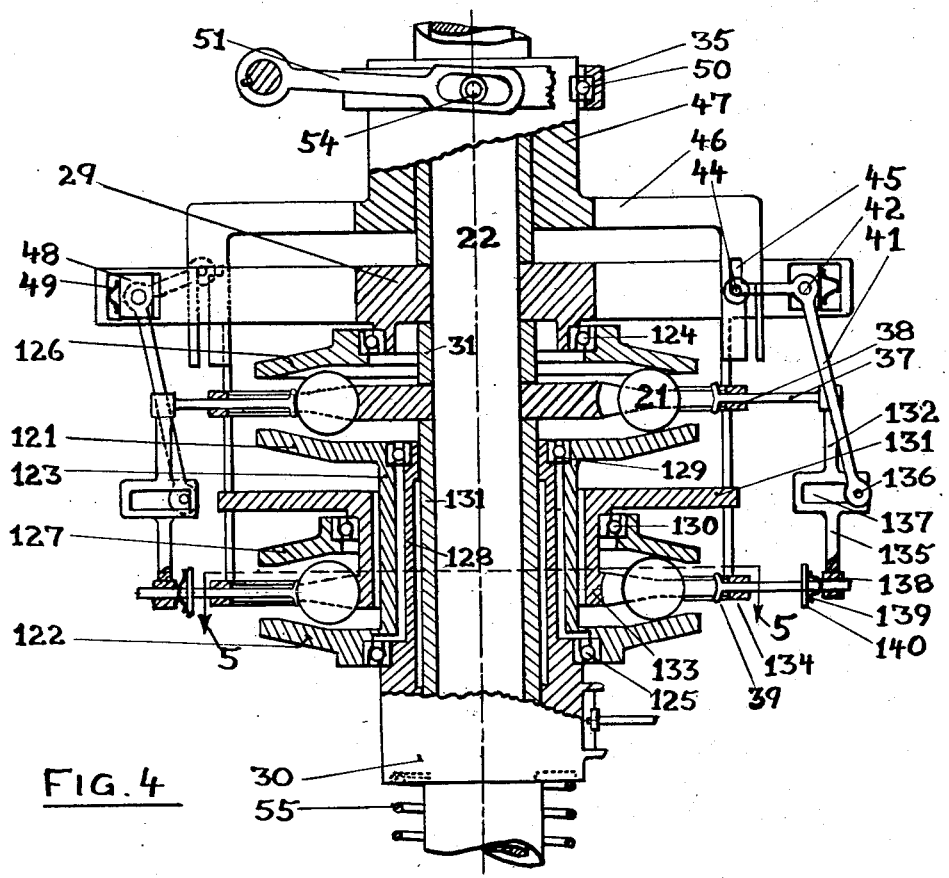
Figs. 4 and 5 are respectively a sectional elevation and sectional plan of a further detail illustrating alternative provision for adjusting the effective centrifugal mass of a governor, Fig. 5 being a section on line 5—5 of Fig. 4.

Figs. 3 and 4 show an embodiment of the invention with a provision for adjusting the effective centrifugal mass on a larger scale than possible with the provision illustrated in Figs. 1 and 2; together with the provision of the separate control-sleeve and secondary spring-means between this and the sleeve-member of the speed responsive device.

The provision for increasing the force exerted on the control-sleeve 56 due to the action of the balls 21 comprises the sleeve-member 30 which is separate from the control sleeve 56 instead of being in one piece with it as in other constructions; and the secondary spring 55 connecting the sleeve-member 30 with the control-sleeve 56. The control-sleeve 56 is from its other side acted upon by the balancing spring-means 109—106—103—107—105—102—112—101, as described in the following, and actuates the control-mechanism of the engine to be governed through the lever-mechanism 57—58.

It will be seen that, for example, for an increase in spindle speed, the sleeve member 30 can move axially downwards due to the increase in centrifugal force acting on the balls by only overcoming the frictional resistance to axial motion of this sleeve, which is very small, and the force of the spring 55, but without having to overcome the resistance, which in an ordinary construction is the main resistance against motion of the sleeve, namely that of the control organ of the engine to be governed. This enables the balls to move outwards, without any motion of the control sleeve 56 as yet having taken place, thus increasing the centrifugal force acting also as function of change of radius, and further compresses the spring 55, so that by this action a considerably larger force is exerted on the control sleeve 56 than the force due to the increase in spindle speed only. This action is described more precisely later in this specification with reference to Fig. 6.

In this embodiment, the total number of balls which can be brought into action together is 27, as compared to the 12 balls of the previously described embodiment, arranged in two races in the same plane, of which the inner race has 9 balls and the outer race has 18 balls. The cups here have two conical portions each—the cup 25 has the additional conical part 91, the generatrix of which is parallel to that of conical surface 25, and cone 26 has the additional conical surface 92, opposite cone surface 92. Correspondingly, cage 23 has two rows of slots, row 24 and row 93, at the two different mean radii of the races. The centre line of every second slot 93 and of every slot 24 are arranged to be on the same radius, so that a locking device comprising a rod 37 mounted in the rim 38 of the cage, with an extension 94 to the inner ring of slots 24, serves both these balls at the same time. The balls in the outer row of slots, which have no counterpart in the inner row, are served by locking devices comprising rod 37 only, exactly as in the example described with reference to Figs. 1 and 2. The governor sleeve 47 as well as whole mechanism of the locking device are denoted by the same reference numerals as those used for the previously described embodiment, and the action of this mechanism will be understood by reference to this preceding description.

In this example, from an initial three balls, which are effective at a high spindle speed (or even two balls), the effective number of balls can be stepped up, with falling spindle speed to a total of 27 balls, with a desired number of balls for each step.

In this embodiment, the balancing spring means has a provision for varying during running of the governor the rate $k$ of the balancing spring means acting on the control sleeve 56 (the rate of this spring means being the change of force taking place for unit motion of one end of the spring means relative to the other along the governor spindle axis). This comprises constructionally a curved abutment surface 101 extending from the control sleeve 56 guided to move along the governor spindle, against which surface 101 abut the rounded heads 102 of 4 symmetrically arranged encased springs 103, these springs being mounted in pairs on an axle 104 extending normally to the governor spindle, to either side of this spindle. The casings surrounding said springs 103 each comprise two parts, 105 and 106, each of which is connected to one end of the spring 103, and having a mounting of two small ball races in a cage 107 between them, which permits the two parts of the casing to move relative to one another only along the axis of the spring. Accordingly, the enclosed spring 103 is only subjected to forces acting along its axis, and not to bending moments, which are taken up by its casing.

The spring casings are arranged in pairs, the casings of each pair being arranged symmetrically to the governor spindle axis, i.e., enclosing the same angle $\alpha$ with this axis. The mounting of these casings on axle 104 is such, that the angles $\alpha$ between the axis of the casing and the governor spindle axis can be adjusted during running of the governor from outside the governor casing, i. e. two of the casings, which are substantially parallel, are mounted on the axle 104 itself, while the other two casings, which are also substantially parallel, are mounted on a sleeve 82 surrounding the axle 104, both the axle 104 and the sleeve 82 being angularly adjustable from outside the casing of the governor. The compression of each spring 103 can also be varied, by mean of the screw threaded rods 108, rotation of which moves plate 109 in slot 110 of the part 106 of the casing of the spring. The part of the casing denoted by 105, which is adjacent the abutment surface 101, is provided with a roller 112 to facilitate motion of part 105 relative to the abutment surface. The angle $\psi$ between the normal to the abutment surface at the point of contact of roller 112 and the governor spindle axis depends in this contruction on the shape of the abutment surface, in the example of a cylindrical abutment surface the angle $\psi=\alpha$.

In operation of the governor, the control sleeve member oscillates up and down, and springs 103 in their casings, which each have a rate $k$ for motion of their ends relative to one another along their own axis, shorten and lengthen, providing a combined spring effect for the motion of the governor sleeve along the governor spindle of a rate $k'$ $$k'=4k\frac{\cos^2\psi}{\cos(\psi\pm\alpha)}$$

Since both angles $\alpha$ and $\psi$ can be influenced during running of the governor, the rate $k'$ can be varied as desired. It will be seen that in this construction the angle $\psi$ varies slightly during operation, as the roller 112 has to roll on the abutment surface 101 during axial motions of the control sleeve member 56, in order that this motion may be able to take place.

Figure 5:
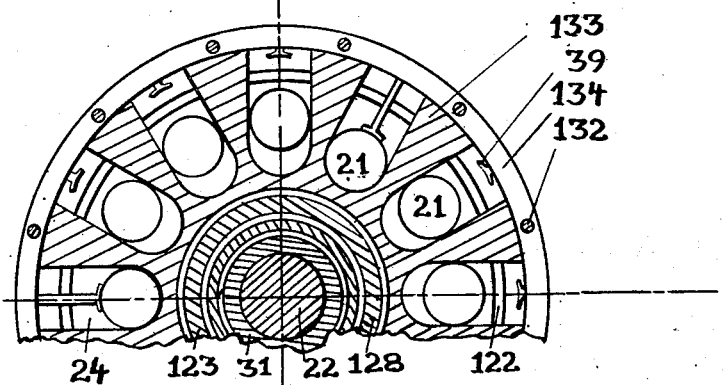

Figs. 4 and 5 show an alternative detail of a governor embodying provision for adjusting the effective centrifugal mass.

In contrast to the previously described example, two sets of balls are here arranged on two different planes disposed along the governor spindle axis, between two similar sets of conical cups in different positions along the governor spindle axis. Conical cups, occupying corresponding positions in the two sets, are connected by tube 123, and are mounted by bearing 125 on sleeve part 30 of the speed responsive device and by bearing 124 on an axial extension of sleeve 30, so that these cups can rotate relative to sleeve 30 under the influence of the balls 21, and can move the sleeve along axially along the spindle 22 as well. The other two corresponding conical cups 126 and 127 are mounted through bearings 129 and 130 on two plates 29 and 131, of which the plate 29 forms an extension of member 47, which is mounted on the governor spindle and fixed by means of a key to rotate with the spindle, and the plate 131 is fixed to member 47 by rods 132 at positions all round the circumference. The cage 23 for the upper set of balls is keyed to the spindle 22, whereas the cage 133 for the lower set of balls is mounted on rotating plate 130, so that it also rotates with spindle speed. The arrangement is made further rigid by the rods 132 connecting, besides the extension from member 29 and plate 130, also the rim 38 of cage 23 and the rim 134 of cage 133.

The locking devices comprise radial rods 37, as in the first embodiment described, mounted in the rims 38 and 134 of cages 23 and 133 respectively. In this case the mechanism shown acts for both sets of balls at once, and in order to achieve this, the angled lever 41 acts on a connecting piece 135 between the rods 37 in corresponding positions in the two sets, engaging connection 135 by means of a pin 136 at slot 137 in a position midway between the two sets of balls, in order to ensure substantially equal forces on both these levers 37 for the two sets. To make the mechanism elastic, and to provide a spring loading on a rod 37, which has locked a ball, so that this ball cannot move about, the rod 37 for the lower set of balls is guided in boss 138 of the connection 135, and the spring 139 between the boss 138 and the flange 140 on this rod 37 pushes the latter inwards.

In the example shown here, the effective number of balls may be increased by suitable steps from an initial three (or even 2 or 1 ball) at the higher mean spindle speeds to be governed to a total of 18 balls for the lowest part range of spindle speeds to be governed.

It will be understood that in all the speed responsive devices described the provision for varying the effective mass of the centrifugal bodies by means of locking rods 37 may be in the nature of a spring loaded switch, e. g. a compression spring may be provided between the rim 38 of the cage and the cup 39 of the locking rod.

Alternatively, a tension spring may be provided between the rim 38 of the cage at its outside, and the slotted end 43 of rod 37.

Other ways of spring-loading the locking provision are also possible without departing from the spirit of this invention.

Figure 6:
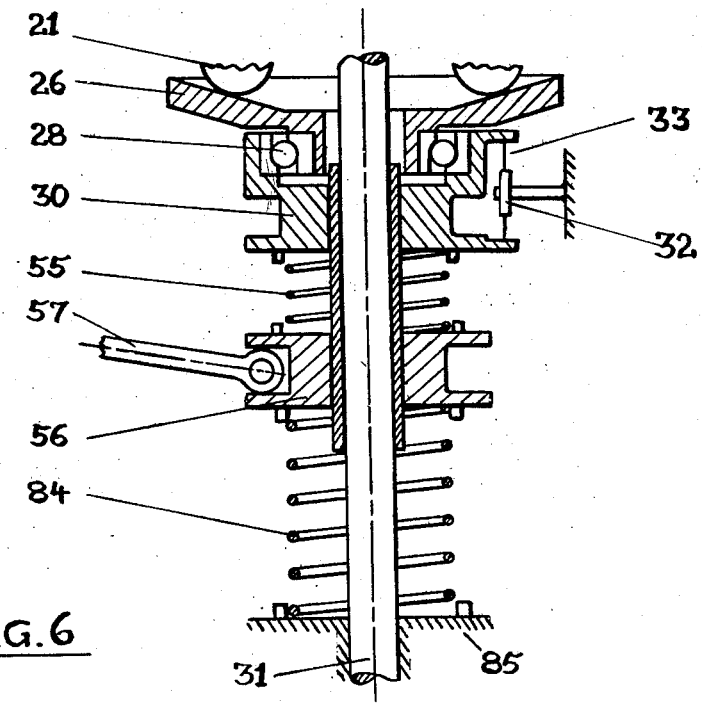
Fig. 6 is a sectional elevation of a detail illustrating the provision of a separate control-sleeve with secondary spring means.

Fig. 6 illustrates as a detail the provision of the separate control-sleeve 56 actuating the control-organ of an engine to be governed through lever 57, which is separated from the sleeve-member 30 of the speed responsive device by the secondary spring means 55, like numerals denoting like parts as on Fig. 3. The resilient balancing mechanism is here represented as the direct acting spring 84, abutting on casing 85, for the sake of clarity.

In operation, for an increase in spindle speed and corresponding increase in centrifugal force, for example, the sleeve member 30 can move downwards merely against the frictional resistance to axial motion of this sleeve, which is negligibly small. Such axial motion takes place therefore without having to overcome the main resistance against sleeve-motion in conventional governors, viz. that of the control organ of the engine to be governed. This enables the balls to move radially outwards without any motion of control-sleeve 56 as yet taking place, thus increasing the centrifugal force acting also as function of the increase in ball-path radius, and further compressing the secondary spring means 55.

This continues until the excess force exerted on the control-sleeve 56 by the secondary spring 55, over that exerted by balancing spring 84 is sufficient to overcome the control-organ resistance, and the control-sleeve 56 begins to move downwards too, in consequence of a change of shaft-speed which in a conventional governor would have been much too small to produce any motion of the sleeve against an equal control organ resistance. Thus the controls are adjusted and spring 84 compressed.

Meanwhile the sleeve-member 30, having gone through zero axial velocity, will reverse its direction of motion, and sleeve 30 and the control sleeve 56 will move in opposite directions for a short time—due to inertia of the control-sleeve and connected component—until stopped by friction. If the adjustment of the control organ is then not the required one, the control-sleeve will be set in motion again by a further oscillation of the type described, until a new steady state is reached, through an oscillatory process of the control-sleeve which is much less than that of the sleeve 30, and less than that of the combined sleeve of a conventional governor.

The main point of the construction is that through the action described, the axial force on the control-sleeve which is caused by a change in centrifugal force $\Delta C_{(\omega)}$ as function of a change of spindle speed only—where $\Delta C_{(\omega)}$ is itself too small to move the control sleeve—is brought to a value considerably greater than $\Delta C_{(\omega)}$, which is sufficient to move the control sleeve.

Thus, due to constructions according to this invention, in variable speed governors a far wider range of speeds will be opened up, particularly at the lower end of the speed range at which in a conventional governor the change of centrifugal force due to a given change in shaft speed would not be sufficient to move the sleeve at all.

On the other hand, through such a construction, it is possible to exert a considerably greater force on a control-mechanism than it would otherwise be possible without a servomotor.

Figure 7:
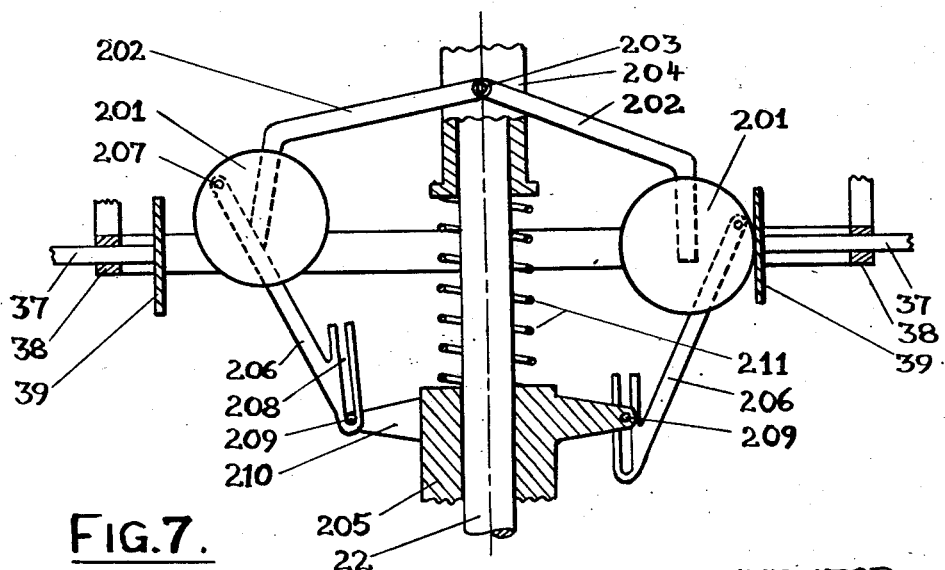
Fig. 7 is a sectional elevation illustrating an alternative provision for adjusting the effective centrifugal mass of a governor.

Fig. 7 shows a detail of a governing mechanism, where instead of a ball and cup type speed responsive device a hinged weight type is provided with means for varying the effective mass of the centrifugal bodies. The centrifugal bodies 201, of cylindrical shape, are rotated about the governor spindle 22 on arms 202 hinged at pin 203 on sleeve 204, which sleeve rotates with the governor spindle but cannot move axially thereto.

The sleeve member 205 is connected to the centrifugal bodies by means of arms 206, which are hinged at pins 207 on the weights 201. The hinged arms 206 have ends 208, with a slot 208 therein extending at a certain calculated angle to the axis of the arm 206, engaging respective pins 209 on extensions 210 on the sleeve 205.

A locking device as described with reference to Fig. 1, comprising a rim 38 mounted on the spindle 22 so as to rotate therewith (detail not here shown), and radial locking rods 37 mounted in said rim, with flat ends 39 for contacting the weight together with all the other levers, sleeves and the like for actuating the locking rods, in combination with the slotted connecting arms 206, form the device for disengaging a weight from connection with the sleeve member, and for re-engaging such a weight to connection with the sleeve member.

In Fig. 7, a weight 201 is shown in the locked position in which it is also disengaged from connection with the sleeve, which moves and fulfills its functions only under the influence of the weight on the left hand side, and of other weights, which are not shown. For the locked weight, on the right hand side, it will be observed, that the slot 208 in the arm 206 is so designed, that in the locked position of the weight 201 the slot 208 extends parallel to the spindle axis, so that pin 209 on the sleeve can slide up and down the slot 208 without hindrance. The weight shown free on the left hand side exerts a pull due to centrifugal force on the sleeve, through its engagement with pin 209 on extension 210 of the sleeve, which is resisted by balancing spring 211, the sleeve thus being stationary or carrying out its motions under the influence of the centrifugal force and of the balancing spring.

A required number of weights may, of course be provided on such a speed responsive device, and due to the locking provisions already described with reference to the preceding examples, any number of these weights can be successively locked or unlocked, so as to provide a wide range of governing efforts to be provided by the sleeve, or a wide range of spindle speeds to be governed to, or a wide range of these variations combined.

I claim:
1. In and for a governing mechanism, a centrifugal speed responsive device comprising a spindle, a set of centrifugal bodies, a guiding means for rotating said centrifugal bodies about said spindle and for permitting radial motion of said centrifugal bodies relative to said spindle, a sleeve member axially movable relative to said spindle, a connecting means between said centrifugal bodies and said sleeve member for relating radial motion of said centrifugal bodies and axial motion of said sleeve member, and manually operable means for varying the centrifugal mass effective in said speed responsive device independently of the axial position of said sleeve member, said means comprising: a frame situated adjacent at least one centrifugal body, a mounting for rotating said frame with said spindle, means mounted in said frame for locking at least said one centrifugal body in a radial position nearest said spindle, in which connection with said sleeve member is disestablished, and for releasing said centrifugal body from said radial position, and manually operable means for actuating said locking and releasing means independently of the axial position of said sleeve member.

2. In and for a governing mechanism, a centrifugal speed responsive device comprising a spindle, a set of balls, a slotted guiding cage mounted on said spindle for rotating said balls about said spindle and for permitting radial motion of said balls, a first member which is axially immovable relative to said spindle and a second member which is axially movable relative to said spindle, both said members being freely rotatable relative to said spindle, at least said second member having a cup-shaped contact surface for said balls, the said balls being interposed between oppositely facing contact surfaces of said two members, a sleeve member axially movable relative to said spindle, a bearing for mounting said second axially movable and rotatable member on said sleeve-member, and manually operable means for varying the centrifugal mass effective in said speed responsive device independently of the axial position of said sleeve-member, said means comprising a frame situated adjacent at least one of said balls, a mounting for rotating said frame with said spindle, means mounted in said frame for locking at least said one ball in the innermost position in said slotted guiding cage in which contact of said ball with said axially movable second member is disestablished, and for releasing said ball from said position, and manually operable means for actuating said locking and releasing means independently of the axial position of said sleeve member.

3. An engine governing mechanism with a centrifugal speed responsive device comprising a spindle, a set of balls, a slotted guiding cage fixed on said spindle for rotating said balls about said spindle and for permitting radial motion of said balls, a first member which is axially immovable relative to said spindle, a second member which is axially movable relative to said spindle, both said members being freely rotatable relative to said spindle, at least one of said members having a cup-shaped contact surface for said balls, said balls being interposed between oppositely facing surfaces of said two members, a sleeve member axially movable relative to said spindle and a bearing for mounting said second, axially movable and rotatable member on said sleeve member, the said engine governing mechanism further comprising a separate control sleeve axially movable relative to said spindle, a means for connecting said control sleeve to an engine to be governed, a resilient balancing means, a connection between said resilient balancing means and said control sleeve, and a secondary spring means situated between and connecting said sleeve-member of said speed responsive device and said control-sleeve, for permitting axial motion of said sleeve member of said speed responsive device independently of said control sleeve.

4. An engine governing mechanism as claimed in claim 3, in which said resilient balancing means is situated on the side of said control sleeve which is remote from said sleeve member of said speed responsive device, and in which said secondary spring means is arranged symmetrically about said spindle and between said sleeve member of said speed responsive device and said control sleeve.

5. In and for a governing mechanism, a centrifugal speed responsive device as claimed in claim 2, comprising two of said sets of balls arranged in two planes normal to said spindle and displaced relative to one another along said spindle, one of said slotted guiding cages for each of said sets of balls and said first rotatable and axially movable member and said second rotatable and axially movable member for each of said sets of balls, a rigid connection for said two rotatable and axially movable second members, said sleeve member axially movable relative to said spindle, said bearing for mounting said second members on said sleeve member, and said manually operable means for varying the number of balls effective as centrifugal masses in each set of balls independently of the axial position of said sleeve member.

MEYER FRENKEL.

References Cited in the file of this patent

UNITED STATES PATENTS

| Number | Name | Date |
|---|---|---|
| 1,534,830 | Behake | Apr. 21, 1925 |
| 1,669,507 | Dickson | May 15, 1928 |
| 2,207,340 | Claus | July 9, 1940 |
| 2,213,824 | Seeley | Sept. 3, 1940 |
| 2,215,406 | Paxman | Sept. 17, 1940 |
| 2,270,100 | Adler | Jan. 13, 1942 |
| 2,281,222 | Baierlein | Apr. 28, 1942 |
| 2,288,382 | Adler | June 30, 1942 |
| 2,290,797 | Benjamin | July 21, 1942 |
| 2,319,654 | Adler | May 18, 1943 |
| 2,473,449 | Rodeck et al. | June 14, 1949 |

FOREIGN PATENTS

| Number | Country | Date |
|---|---|---|
| 151,935 | Germany | June 2, 1904 |
| 416,647 | Germany | July 22, 1925 |